US006635142B1

(12) United States Patent
Stula et al.

(10) Patent No.: US 6,635,142 B1
(45) Date of Patent: Oct. 21, 2003

(54) PROCESS FOR THE PREPARATION OF A DECORATED SUBSTRATE

(75) Inventors: Vladimir Stula, Cernobbio (IT); Tullio Rossini, Como (IT)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/857,139

(22) PCT Filed: Nov. 30, 1999

(86) PCT No.: PCT/EP99/09327

§ 371 (c)(1),
(2), (4) Date: Jun. 11, 2001

(87) PCT Pub. No.: WO00/32420

PCT Pub. Date: Jun. 8, 2000

(30) Foreign Application Priority Data

Dec. 3, 1998 (EP) .......................................... 98204086

(51) Int. Cl.[7] ........................ B32B 31/28; B44C 1/165; B44C 5/04; B05D 3/06; B41M 3/12

(52) U.S. Cl. ............................... 156/273.3; 156/272.2; 156/230; 156/240; 156/247; 156/277; 156/289; 427/146; 427/147; 427/148; 427/299; 427/372.2; 428/195; 428/202; 428/914; 8/468; 8/471

(58) Field of Search ................................ 156/230, 240, 156/247, 272.2, 277, 289, 276, 344, 273.3; 427/146, 147, 148, 299, 322, 372.2; 428/195, 202, 914; 8/468, 471

(56) References Cited

U.S. PATENT DOCUMENTS

| | | | | |
|---|---|---|---|---|
| 3,907,974 A | 9/1975 | Smith | ......................... | 428/346 |
| 4,715,913 A | * 12/1987 | Middleton | .................... | 156/85 |
| 5,718,792 A | * 2/1998 | Goode | ........................ | 156/228 |
| 5,962,368 A | * 10/1999 | Poole | ......................... | 503/227 |
| 5,976,296 A | * 11/1999 | Sherman et al. | ............ | 156/230 |
| 6,136,126 A | * 10/2000 | Fenzi | ......................... | 156/230 |
| 6,335,749 B1 | * 1/2002 | Carizzoni et al. | ........... | 347/171 |
| 6,340,504 B1 | * 1/2002 | Neumann et al. | ........... | 427/493 |

FOREIGN PATENT DOCUMENTS

| | | | |
|---|---|---|---|
| EP | 014 901 | 9/1980 | ............ B41M/5/02 |
| EP | 060 107 | 9/1982 | ............ B41M/5/02 |
| WO | WO 96/29208 | 9/1996 | ............. B44C/1/17 |
| WO | WO 98/08694 | 3/1998 | ............. B44C/1/17 |

OTHER PUBLICATIONS

Derwent Abstract No. 003809100 (1983), abstracting JP 58162374.
Abstract of JP 58162374 from EPO on–line data base esp@cenet.
Derwent Abstract No. 64536 (1980), abstracting EP 14 901.
International Search Report PCT/EP 99/09327.

* cited by examiner

*Primary Examiner*—J. A. Lorengo
(74) *Attorney, Agent, or Firm*—Lainie E. Parker; David H. Vickrey

(57) ABSTRACT

A process for the preparation of a decorated substrate comprising the steps of: submitting the substrate to a treatment to prepare its surface for the application of a coating; applying a coating to the surface of the substrate in one or more cycles; covering the surface of the substrate with a sheet comprising a decoration which is to be transferred to the surface of the substrate; and heating the substrate and the sheet comprising the decoration to effect the transfer of the decoration from the sheet onto the substrate. In this process, the coating is cured using electromagnetic radiation having a wavelength shorter than 400 nm, until a coating is obtained having a Tg between 50 and 130° C. and a scar resistance at 200° C. of at least 3N and wherein the temperature during the transfer of the decoration to the substrate is from 180 to 220° C. The process is particularly suited to the decoration of heat sensitive substrates, like MDF or wood.

20 Claims, No Drawings

PROCESS FOR THE PREPARATION OF A DECORATED SUBSTRATE

This application is the national phase of International Patent Application No. PCT/EP99/09327, filed on Nov. 30, 1999, and which claims priority of European Patent Application No. 98204086.7, filed Dec. 3, 1997.

BACKGROUND OF THE INVENTION

The present invention relates to a process for the preparation of a decorated substrate comprising the steps of:

- submitting the substrate to a treatment to prepare its surface for the application of a coating,
- applying a coating to the surface of the substrate in one or more cycles,
- covering the surface of the substrate with a sheet comprising a decoration which is to be transferred to said surface, and
- heating the substrate and the sheet comprising the decoration to effect the transfer of the decoration from the sheet onto the substrate.

Such a process is known from patent application WO 96/29208, which is directed to a process and the relevant apparatus for making decorated, extruded, profiled elements. However, in this publication very little information is given on the material used to coat the surface of the substrate.

In U.S. Pat. No. 3,907,974 curable decorating systems for glass or metal containers using a heat transfer decoration are disclosed. This patent is mainly concerned with the heat transfer decoration itself, i.e. a sheet comprising the decoration. Such a decoration can be built up of multiple layers comprising a clear lacquer, a binder, a hardener, solvents, dyes, etc. Before the decoration is applied to it, the substrate is treated with a silane adhesion promoter. Before application of the decoration, the substrate is heated to a temperature of 65 to 120° C. After transfer of the decoration, the decorated substrate is heat cured for 10–20 minutes at 95–150° C. and optionally cured further for 10–20 minutes at 175–230° C.

In view of the comparatively high temperatures used in the curing of the decorated substrate over a relatively long time, this technique is not suitable for the decoration of heat sensitive substrates like wood, wood-containing materials, or (shaped) plastic materials which are susceptible to heat.

In EP 60 107 a process for transfer printing is disclosed in which a substrate (a continuous length of strip) is coated with a thermosetting material, e.g., an alkyd, polyester, polyurethane or epoxy paint. Immediately after curing at a temperature between 190 and 250° C. the substrate is brought into contact with a continuous strip of printed material. At a temperature between 180–280° C. the printing ink is transferred to the strip by sublimation.

In view of the relatively high temperature applied to the substrate during the curing of the coating, the process disclosed in this publication is not suitable for the decoration of heat sensitive substrates either.

In EP 14 901 a process for transfer printing of a heat sensitive substrate is disclosed. In this process, the substrate is heated to a temperature above 220° C., which makes this process also not suited for the decoration of a heat sensitive substrate.

In JP 58-162374 a process is disclosed for transferring a dye to PVC mouldings by using a UV-curable resin.

In WO 98/08694 a process is disclosed for decorating metal, plastic or the like materials. In this publication very little information is given on the material used to coat the surface of the substrate.

SUMMARY OF THE INVENTION

The process according to the present invention provides a process for the decoration of heat sensitive substrates. By using this process, the decoration on the substrates can be very detailed and bright colours can be used without the danger of colour diffusion. The thus decorated substrate is very durable and shows excellent weather and outdoor resistance. The technique is also applicable for heat resistant substrates.

In comparison with the processes known in the art, the process according to the present invention comprises the following additional steps, viz. that the coating is cured using electromagnetic radiation having a wavelength shorter than 400 nm, until a coating is obtained which has a $T_g$ between 50 and 130° C. and a scar resistance at 200° C. of at least 3N and wherein the temperature during the transfer of the decoration into the coating is from 180 to 220° C.

DETAILED DESCRIPTION OF THE INVENTION

Within the framework of the present invention, a heat sensitive substrate is a substrate that shows deformation, structural changes, discolouration, or other thermal damage when heated for a prolonged time to a temperature above 200° C.

Several apparatus can be used as a source of electromagnetic radiation with a wavelength shorter than 400 nm. In view of their availability and ease of incorporation into a production process, UV lamps or an apparatus generating an electron beam are preferred.

It was found that for a proper transfer of the decoration from the sheet onto the coated substrate, the $T_g$ and the hardness of the coating at the temperature at which the transfer of the decoration takes place are of the utmost importance.

If the $T_g$ is too low, i.e. below 50° C., the coating will be too soft at the transfer temperature in the range of 180 to 220° C. This will hamper the release of the sheet from the substrate after the transfer of the decoration, due to the softening of the coated surface.

If the $T_g$ is too high, i.e. above 130° C., the coating will be too brittle, causing easy damaging of the substrate in normal use and, for some substrates, poor adhesion between the coating and the surface.

In view of the optimum results obtained in the heat transfer of a decoration, preference is given to a coating that is cured until it has a $T_g$ between 80 and 110° C.

Further, the hardness of the coating at the temperature at which the decoration is transferred onto the substrate is important. If the hardness is too low, the release of the sheet from the substrate after the transfer of the decoration will be hampered. If the hardness is too high, an incomplete transfer of the decoration will be observed (or a longer time is needed for the complete transfer of the decoration) and also the adhesion between the coating and the surface will be lower.

A reliable measure of the hardness of the coating at the temperature at which the decoration is transferred onto the substrate is the scar resistance of the cured coating at 200° C. For a quick release of the sheet from the substrate, the scar resistance should be at least 3N, preferably at least 8N, more in particular at least 11N. The upper limit for the scar resistance is given by the time needed for the complete transfer of the decoration. This maximum time depends, int. al., on the thermal stability of the substrate. In general, it can be said that the scar resistance should be less than 30N in order to have the transfer of the decoration onto the substrate achieved in a reasonable period of time when the temperature during the transfer of the decoration into the coating is from 180 to 220° C.

Before a decoration is transferred onto it, the substrate is coated. The coating used in the process according to the present invention is one that can be cured by using electromagnetic radiation with a wavelength shorter than 400 nm, e.g., a coating that can be cured using UV light or electron beam radiation.

Before or during curing, the coating can be heated to accelerate the curing. However, this is not compulsory. Above all, during curing the temperature should not be so high as to have a negative impact on the properties of the substrate.

In particular for heat sensitive substrates, the manner of heating the substrate is important. For these substrates, IR heating is particularly useful. Using IR heating makes it possible to have only the sheet containing the decoration and the surface layer of the coated substrate reach the temperature in the range of 180–220° C. necessary for the transfer by sublimation of the decoration.

In a preferred embodiment of the present process, the coating is fully cured before the decoration is transferred onto the substrate.

For the process according to the present invention, in principle all coating compositions can be used, provided that the adhesion to the substrate is sufficient, the coating can be cured using electromagnetic radiation with a wavelength shorter than 400 nm, and the coating can be cured to a $T_g$ between 50 and 130° C. and a scar resistance at 200° C. of at least 3N.

Since powder coatings can easily be cured using electromagnetic radiation without a need for the evaporation of any solvent, the use of powder coatings is preferred in the process according to the present invention.

Examples of UV curing coating compositions that can be used in the process according to the present invention are systems that contain as a binder unsaturated resins (unsaturated (meth)acrylates resins, unsaturated allyl resins, unsaturated vinyl resins), acrylated epoxies, acrylated aliphatic or aromatic urethane oligomers, acrylated polyester or acrylic oligomers, semi-crystalline or amorphous polyesters. The binder further can contain mono- or multifunctional monomers as co-reactants. Examples of commercially available suitable unsaturated resins include VIAKTIN® VAN 1743 (a solid unsaturated polyester resin), URALAC® XP 3125 (a solid unsaturated amorphous polyester resin), and CRYLCOAT® E5252 (a solid unsaturated polyester resin). Examples of commercially available co-reactants are VIAKTIN® 03546 (an aliphatic urethane adduct with acrylic functional groups) and URALAC® ZW 3307P.

Optionally, photoinitiators, radical initiators (peroxides, azo-bis-isobutyronitryl, etc.), additives such as flow agents, defoamers, wetting agents, flatting agents, slip aids, and other coating additives known to the skilled person can be incorporated into the composition. For most UV curing coating compositions the incorporation of a photoinitiator is preferred.

Examples of commercially available suitable photoinitiators include IRGACURE® 184, IRGACURE® 819, IRGACURE® 1800, IRGACURE® 1850, IRGACURE® 2959, and CGI 1700. Addition of a radical initiator, alone or in combination with a photoinitiator, can be of advantage for heat or mixed heat/UV curing of unsaturated systems.

To obtain a coloured coating on the substrate, the composition can further comprise pigments and fillers.

In principle, the coating compositions that are used in UV-curing systems can also be used in electron beam curing systems. However, in these compositions the use of a photoinitiator in general does not lead to better or faster curing of the coating.

Furthermore, cationic polymerisation compositions can be used. In general, these compositions comprise epoxy resins, cycloaliphatic epoxies or vinyl ethers as a binder, an alcohol or a mixture of alcohols as a chain transfer agent, and initiators. In these compositions sulfonium-iodonium-diazonium salts are preferred as initiators.

Optionally, the cationic polymerisation compositions may comprise additives, pigments and/or fillers.

The treatment to prepare the surface of the substrate for the application of a coating may comprise well-known methods for cleaning a surface, such as brushing, washing, de-greasing, phosphating and/or chromating. The application of a primer can be included in this treatment. However, this is optional, e.g., to obtain special decoration effects, to improve the properties of the substrate surface such as by hiding its defects, to improve adhesion, or to improve the applicability of a coating (e.g., a conductive primer, to facilitate electrostatic powder application onto non-conductive substrates like wood or MDF).

In general, the process of coating the surface of a substrate with a powder coating comprises the following steps:

application of the powder coating by processes known in the art, e.g., spraying with an electrostatic or tribo-electric gun, melting of the powder by convection or radiation heating (for heat sensitive substrates preference is given to the use of IR heating of the side of the substrate that is to be covered by the coating)

curing of the coating, which in the process according to the present invention entails the use of electromagnetic radiation having a wavelength shorter than 400 nm.

The sheet comprising the decoration can be, e.g., a paper or textile sheet provided with the decoration. For these decorations so-called sublimatic pigments or dyestuffs are used. These decorated sheets are well-known in the art.

Optionally, a (clear) topcoat can be applied to the substrate after transfer of the decoration. This can be done to obtain special decoration effects and/or to improve the properties of the decorated surface.

The process according to the present invention is in particular suited for the decoration of heat sensitive substrates like cellulose-containing or plastic substrates. Examples of heat-sensitive substrates are wooden substrates, MDF-substrates, veneer, fibre boards, plastic parts (e.g. PVC parts), and electric circuit boards. However, the process can also be used for the decoration of other, non-heat sensitive substrates, such a metal, glass, concrete or ceramic substrates.

MEASUREMENT METHODS

$T_g$ of a Cured Coating

The glass transition temperature, $T_g$, is the temperature at which the coating modifies its solid state to a rubber-like state. This is a second-order phase transition, which can be shown as a variation of specific heat.

$T_g$ is measured using a differential scanning calorimeter. The following procedure was used for a Perkin-Elmer DSC-7:

15–20 mg of the cured coating is placed in an aluminium sample pan provided with a lid. The lid is closed under a press and the sample pan is placed in the DSC-7. The Glass Transition Temperature program is started, involving uniform heating of the sample at a rate of 10° C./min from 20° C. up to 180° C.

The program automatically generates data for the glass transition temperature as TG1 (transition starting), TG2 (half transition), and TG3 (transition end). TG2 is taken as the $T_g$ of the cured coating sample.

For the measurement of $T_g$ reference is made to DIN 53765 and ASTM D 3418.

Scar Resistance

To measure the scar resistance of a cured coating, the coating is applied to a steel panel in a film thickness of 60–80 μm and cured. The scar resistance is measured using an Oesterle model 435 scar resistance tester (Erichsen Instrument). Measurements at temperatures above room temperature were performed in an oven, after checking that the coating had effectively reached the indicated testing temperature. The scar resistance refers to the minimal pressure whereby a deep sign/scratch remains in the film.

EXAMPLES

Example 1

A clear powder coating having the following composition is prepared:

| Component | Amount (parts by weight) |
|---|---|
| Unsaturated polyester resin[1] | 64 |
| Co-reactant[2] | 28 |
| UV photoinitiator | 3 |
| Flow control agent | 5 |
| Other additives | <1 |

[1]Unsaturated polyester, $T_g > 45°$ C., acid value < 25
[2]Acryl/urethane adduct, $T_g > 50°$ C.

The powder coating is applied using an electrostatic spraying gun to a pre-treated MDF substrate. The substrate is pre-treated by being passed through an IR oven. So much coating material is applied as will give a coating with a thickness between 60 and 100 μm. The coating is cured using UV light. The obtained coating has a high gloss, very good adhesion to the substrate, and an excellent solvent resistance. The $T_g$ of the cured coating is 71° C., the scar resistance at 200° C.=6N.

The following conditions were used:

IR oven with 10 IR lamps (medium wave 2000–4000 nm, 0.8 kW each) for melting the coating; distance lamp–substrate=15 cm; sample placed on a belt, belt speed 0,5 m/min.

UV oven with 1 lamp GST 400, 80W/cm, Hg 360 nm+1 lamp GST 400, 80 W/cm, Ga 420 nm; distance lamp–substrate=14 cm; sample placed on a belt, belt speed 2 m/min.

The coated MDF substrate is then decorated by covering it with a heat-transfer paper containing sublimatic dyestuffs and keeping it in a press heated at 190–200° C. for 30–40 seconds.

After sublimatic transfer of the decoration the paper sheet does not stick to the coated substrate and can be released easily. The decoration is well fixed and protected by the coating; it cannot be removed by a solvent, the light fastness is excellent.

Example 2

Example 1 is repeated using a white powder coating having the following composition:

| Component | Amount (parts by weight) |
|---|---|
| Unsaturated polyester resin[1] | 57 |
| Co-reactant[2] | 25 |
| UV photoinitiator | 3 |
| Flow control agent | 5 |
| Other additives | <1 |
| $TiO_2$ pigment | 10 |

[1]Unsaturated polyester, $T_g > 45°$ C., acid value < 25
[2]Acryl/urethane adduct, $T_g > 50°$ C.

The obtained coating has a high gloss, very good adhesion to the substrate, and an excellent solvent resistance. The $T_g$ of the cured coating is 64° C., the scar resistance at 200° C.=5N After sublimatic transfer of the decoration the paper sheet does not stick to the coated substrate and can be released easily. The decoration is well fixed and protected by the coating; it cannot be removed by a solvent, the light fastness is excellent.

Example 3

The clear powder coating composition of Example 1 is applied using an electrostatic spraying gun to a pre-treated ceramic substrate, terra-cotta without vitreous enamel (i.e. "raw" tiles). The substrate can be pre-treated by:

heating the substrate to a temperature above 90° C. just prior to the application of the powder coating, cooling the substrate to a temperature below 0° C. and applying the powder coating directly after the cooling at room temperature in air having a relative humidity above 50%, or applying a conductive liquid primer.

Under the same conditions as given in Example 1, a decorated ceramic substrate is obtained.

After sublimatic transfer of the decoration the paper sheet does not stick to the coated substrate and can be released easily. The decoration is well fixed and protected by the coating; it cannot be removed by a solvent, the light fastness is excellent.

Example 4

The white powder coating composition of Example 2 is applied using an electrostatic spraying gun to a pre-treated ceramic substrate, terra-cotta without vitreous enamel (i.e. "raw" tiles). The substrate can be pre-treated by:

heating the substrate to a temperature above 90° C. just prior to the application of the powder coating, cooling the substrate to a temperature below 0° C. and applying the powder coating directly after the cooling at room temperature in air having a relative humidity above 50%, or applying a conductive liquid primer.

Under the same conditions as given in Example 2, a decorated ceramic substrate is obtained.

After sublimatic transfer of the decoration the paper sheet does not stick to the coated substrate and can be released easily. The decoration is well fixed and protected by the coating; it cannot be removed by a solvent, the light fastness is excellent.

Example 5

The clear powder coating composition of Example 1 is applied using an electrostatic spraying gun to a pre-treated ceramic substrate with a vitrified email surface. The substrate can be pre-treated by:

applying a liquid adhesion promotor (e.g. water or solvent dispersions of titanium tetrachloride or of an epoxy-functional silane or siloxane coupling agent) and heating the substrate to a temperature above 90° C. just prior to the application of the powder coating, applying a conductive liquid primer comprising an adhesion promotor.

Under the same conditions as given in Example 1, a decorated ceramic substrate is obtained.

After sublimatic transfer of the decoration the paper sheet does not stick to the coated substrate and can be released easily. The decoration is well fixed and protected by the coating; it cannot be removed by a solvent, the light fastness is excellent.

Example 6

The white powder coating composition of Example 2 is applied using an electrostatic spraying gun to a pre-treated ceramic substrate with a vitrified email surface. The substrate can be pre-treated by:

applying a liquid adhesion promotor (e.g. water or solvent dispersions of titanium tetrachloride or of an epoxy-functional silane or siloxane coupling agent) and heating the substrate to a temperature above 90° C. just prior to the application of the powder coating, applying a conductive liquid primer comprising an adhesion promotor.

Under the same conditions as given in Example 2, a decorated ceramic substrate is obtained.

After sublimatic transfer of the decoration the paper sheet does not stick to the coated substrate and can be released easily. The decoration is well fixed and protected by the coating; it cannot be removed by a solvent, the light fastness is excellent.

Example 7

Example 5 was repeated while using a glass substrate. The glass substrate can be pre-treated in the same manner as the ceramic substrate with a vitrified email surface.

After sublimatic transfer of the decoration the paper sheet does not stick to the coated substrate and can be released easily. The decoration is well fixed and protected by the coating; it cannot be removed by a solvent, the light fastness is excellent.

Example 8

Example 6 was repeated while using a glass substrate. The glass substrate can be pre-treated in the same manner as the ceramic substrate with a vitrified email surface.

After sublimatic transfer of the decoration the paper sheet does not stick to the coated substrate and can be released easily. The decoration is well fixed and protected by the coating; it cannot be removed by a solvent, the light fastness is excellent.

Comparative Example

Example 1 is repeated using a white powder coating having the following composition:

| Component | Amount (parts by weight) |
|---|---|
| Unsaturated polyester[1] | 66 |
| UV photoinitiator | 3 |
| Other additives | <1 |
| $TiO_2$ pigment | 23 |
| $BaSO_4$ filler | 7 |

[1]Unsaturated polyester, $T_g$ > 45° C., hydroxyl value 32–40.

The obtained coating has a high gloss, sufficient adhesion to the substrate, and a good solvent resistance. The $T_g$ of the cured coating is 50° C., the scar resistance at 200° C. is smaller than 3N.

After sublimatic transfer of the decoration the paper sheet sticks to the substrate and cannot be released easily. After removal of the paper sheet by using water, permanent spots remain on the decorated surface.

We claim:

1. A process for the preparation of a decorated substrate comprising the steps of:

submitting the substrate to a treatment to prepare its surface for the application of a coating, applying a coating to the surface of the substrate in one or more cycles, covering the surface of the substrate with a sheet comprising a decoration which is to be transferred to the surface of the substrate, heating the substrate and the sheet comprising the decoration to effect the transfer of the decoration from the sheet onto the substrate, wherein the coating is cured using electromagnetic radiation having a wavelength shorter than 400 nm, until a coating is obtained having a $T_g$ between 50 and 130° C. and a scar resistance at 200° C. of at least 3N and wherein the temperature during the transfer of the decoration to the substrate is from 180 to 220° C.

2. A process according to claim 1, wherein the coating is cured until it has a $T_g$ between 80 and 110° C.

3. A process according to claim 1 wherein the coating is cured using UV light or an electron beam.

4. A process according to claim 1 wherein the substrate is a heat sensitive substrate.

5. A process according to claim 1 wherein a powder coating is applied to the surface of the substrate.

6. A process according to claim 1 wherein the coating is fully cured before the decoration is transferred to the surface of the substrate.

7. A process according to claim 1 wherein the cured coating has a scar resistance of at least 8N.

8. A process according to claim 2 wherein the coating is cured using UV light or an electron beam.

9. A process according to claim 2 wherein the substrate is a heat sensitive substrate.

10. A process according to claim 2 wherein a powder coating is applied to the surface of the substrate.

11. A process according to claim 2 wherein the coating is fully cured before the decoration is transferred to the surfaced of the substrate.

12. A process according to claim 2 wherein the cured coating has a scar resistance of at least 8N.

13. A process according to claim 9 wherein a powder coating is applied to the surface of the substrate.

14. A process according to claim 13 wherein the coating is fully cured before the decoration is transferred to the surface of the substrate.

15. A process according to claim 14 wherein the cured coating has a scar resistance of at least 8N.

16. A process according to claim 10 wherein the coating is fully cured before the decoration is transferred to the surface of the substrate.

17. A process according to claim 16 wherein the cured coating has a scar resistance of at least 8N.

18. A process according to claim 11 wherein the cured coating has a scar resistance of at least 8N.

19. A decorated substrate made by the process of claim 1.

20. A decorated substrate made by the process of claim 4.

* * * * *